(12) United States Patent
Takahashi et al.

(10) Patent No.: US 11,092,290 B2
(45) Date of Patent: Aug. 17, 2021

(54) METHOD FOR MEASURING FLUID LEVEL IN LIQUID HYDROGEN TANK AND LIQUID HYDROGEN STORAGE SYSTEM

(71) Applicant: TOYOTA JIDOSHA KABUSHIKI KAISHA, Toyota (JP)

(72) Inventors: Takaaki Takahashi, Toki (JP); Osamu Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 16/672,614

(22) Filed: Nov. 4, 2019

(65) Prior Publication Data
US 2020/0208781 A1     Jul. 2, 2020

(30) Foreign Application Priority Data

Dec. 27, 2018    (JP) .............................. JP2018-244131

(51) Int. Cl.
| | |
|---|---|
| *F17C 13/02* | (2006.01) |
| *F17C 7/02* | (2006.01) |
| *G01F 23/14* | (2006.01) |
| *G01F 15/00* | (2006.01) |
| *G01F 1/00* | (2006.01) |

(52) U.S. Cl.
CPC ............... *F17C 13/02* (2013.01); *F17C 7/02* (2013.01); *G01F 1/00* (2013.01); *G01F 15/005* (2013.01); *G01F 23/14* (2013.01); *F17C 2221/012* (2013.01); *F17C 2250/043* (2013.01); *F17C 2250/0408* (2013.01); *F17C 2250/0443* (2013.01); *F17C 2250/0694* (2013.01)

(58) Field of Classification Search
CPC .. F17C 13/02; F17C 7/02; G01F 23/14; G01F 15/005; G01F 1/00
USPC ............................................................ 73/198
See application file for complete search history.

(56) References Cited

U.S. PATENT DOCUMENTS

| | | | | |
|---|---|---|---|---|
| 4,905,719 | A | * | 3/1990 | Lawless ................... F17C 5/02 137/1 |
| 2014/0096539 | A1 | * | 4/2014 | Gustafson .......... F02M 21/0221 62/49.1 |
| 2015/0332811 | A1 | | 11/2015 | Yamada et al. |

FOREIGN PATENT DOCUMENTS

| | | | | |
|---|---|---|---|---|
| EP | 1808638 A2 | * | 7/2007 | ............ F17C 13/026 |
| JP | 2012-7990 A | | 1/2012 | |

(Continued)

*Primary Examiner* — Timothy L Maust
*Assistant Examiner* — James R Hakomaki
(74) *Attorney, Agent, or Firm* — Oblon, McClelland, Maier & Neustadt, L.L.P.

(57) ABSTRACT

An amount Y of liquid hydrogen that has passed through a first valve and has been volatilized during a predetermined time after first and second valves are opened is calculated by using a pressure P0 in an internal space of a liquid hydrogen tank measured before the two valves are opened, a pressure P1 in the internal space measured after the lapse of the predetermined time since the two valves are opened, and an amount X of the gaseous hydrogen that has passed through the second valve during the predetermined time. A fluid level H of the liquid hydrogen in the liquid hydrogen tank after the lapse of the predetermined time since the two valves are opened is calculated by using a expression showing a relationship between the H and an amount Y1 of the liquid hydrogen that passes through the first valve and drops therefrom, and the Y.

4 Claims, 4 Drawing Sheets

(56) References Cited

FOREIGN PATENT DOCUMENTS

| | | |
|---|---|---|
| JP | 5356888 B2 | 12/2013 |
| JP | 5440678 B1 | 3/2014 |

\* cited by examiner

METHOD FOR MEASURING FLUID LEVEL IN LIQUID HYDROGEN TANK AND LIQUID HYDROGEN STORAGE SYSTEM

CROSS REFERENCE TO RELATED APPLICATIONS

This application is based upon and claims the benefit of priority from Japanese patent application No. 2018-244131, filed on Dec. 27, 2018, the disclosure of which is incorporated herein in its entirety by reference.

BACKGROUND

The present disclosure relates to a method for measuring a fluid level in a liquid hydrogen tank and a liquid hydrogen storage system.

In recent years, there has been an increasing demand for reducing CO2 due to environmental problems such as global warming. Therefore, the need for hydrogen that does not discharge CO2 at the time of oxidation reaction is expected to increase in the future.

Further, even though hydrogen can be stored as either liquid hydrogen or gaseous hydrogen, liquid hydrogen is advantageous because its storage efficiency is higher than that of gaseous hydrogen. Therefore, it is expected that in the future, there will be an increasing number of cases in which a liquid hydrogen tank capable of storing liquid hydrogen is introduced into vehicles or plants and the hydrogen is used in the form of gaseous hydrogen by volatilizing the liquid hydrogen stored in the liquid hydrogen tank.

In view of this, recently, various techniques for managing liquid hydrogen in a liquid hydrogen tank have been proposed. For example, Japanese Patent No. 5440678 discloses a technique for measuring a fluid level of liquid hydrogen in a liquid hydrogen tank using a liquid hydrogen fluid-level sensing element.

In the technique disclosed in Japanese Patent No. 5440678, a liquid hydrogen fluid-level sensing element made of a superconductive alloy is disposed so as to come into contact with liquid hydrogen, i.e., the sensing element is disposed at such a height that it is partially immersed in the liquid hydrogen. Then, by employing the difference in electric resistance between the part of the sensing element which is immersed in the liquid hydrogen and the part of the sensing element which is not immersed in the liquid hydrogen, the fluid level of the liquid hydrogen in the liquid hydrogen tank is measured.

SUMMARY

However, in the technique disclosed in Japanese Patent No. 5440678, it is necessary to immerse the liquid hydrogen fluid-level sensing element in liquid hydrogen having a boiling point of approximately 20K under the atmospheric pressure. It is, therefore, necessary to form the liquid hydrogen fluid-level sensing element out of a superconductive alloy or the like which is resistive to low temperatures as well as explosion-proof, leading to a problem that the liquid hydrogen fluid-level sensor element becomes extremely costly and is difficult to be incorporated into a system.

The present disclosure has been made in view of the aforementioned problem and provides a method for measuring a fluid level in a liquid hydrogen tank and a liquid hydrogen storage system by which a fluid level of liquid hydrogen in a liquid hydrogen tank can be measured by using an inexpensive configuration.

A first exemplary aspect is a method for measuring a fluid level in a liquid hydrogen tank performed in a liquid hydrogen storage system, the liquid hydrogen storage system including:

the liquid hydrogen tank configured so that liquid hydrogen can be injected and stored therein;

a liquid hydrogen dispensing pipe disposed vertically below the liquid hydrogen tank and configured to dispense the liquid hydrogen from the liquid hydrogen tank;

a first adjustment valve disposed at a midway point of the liquid hydrogen dispensing pipe and configured to adjust an amount of the liquid hydrogen dispensed from the liquid hydrogen tank;

a heat exchanger connected to the liquid hydrogen dispensing pipe;

a gaseous hydrogen supply pipe configured to supply gaseous hydrogen that has passed through the heat exchanger to a downstream side;

a second adjustment valve disposed at a midway point of the gaseous hydrogen supply pipe and configured to adjust an amount of the gaseous hydrogen supplied to the downstream side;

a gaseous hydrogen recirculation pipe configured to recirculate the gaseous hydrogen that has passed through the heat exchanger to an internal space of the liquid hydrogen tank;

a pressure gauge configured to measure a pressure in the internal space of the liquid hydrogen tank; and a gas flowmeter configured to measure an amount of the gaseous hydrogen that has passed through the second adjustment valve and has been supplied to the downstream side, the method including:

a volatilization amount calculation step of calculating an amount Y of the liquid hydrogen that has passed through the first adjustment valve and has been volatilized during a predetermined time after the first and second adjustment valves are opened by using a pressure P0 in the internal space of the liquid hydrogen tank that is measured before the first and second adjustment valves are opened, a pressure P1 in the internal space of the liquid hydrogen tank that is measured after the lapse of the predetermined time since the first and second adjustment valves are opened, and an amount X of the gaseous hydrogen that has passed through the second adjustment valve and has been supplied to the downstream side during the predetermined time; and a fluid level calculation step of calculating a fluid level H of the liquid hydrogen in the liquid hydrogen tank after the lapse of the predetermined time since the first and second adjustment valves are opened by using a relational expression showing a relationship between the fluid level H of the liquid hydrogen in the liquid hydrogen tank and an amount Y1 of the liquid hydrogen that passes through the first adjustment valve and drops therefrom, and the amount Y of the liquid hydrogen obtained in the volatilization amount calculation step.

Another exemplary aspect is a liquid hydrogen storage system including: a liquid hydrogen tank configured so that liquid hydrogen can be injected and stored therein;

a liquid hydrogen dispensing pipe disposed vertically below the liquid hydrogen tank and configured to dispense the liquid hydrogen from the liquid hydrogen tank;

a first adjustment valve disposed at a midway point of the liquid hydrogen dispensing pipe and configured to adjust an amount of the liquid hydrogen dispensed from the liquid hydrogen tank;

a heat exchanger connected to the liquid hydrogen dispensing pipe; a gaseous hydrogen supply pipe configured to supply gaseous hydrogen that has passed through the heat exchanger to a downstream side;

a second adjustment valve disposed at a midway point of the gaseous hydrogen supply pipe and configured to adjust an amount of the gaseous hydrogen supplied to the downstream side;

a gaseous hydrogen recirculation pipe configured to recirculate the gaseous hydrogen that has passed through the heat-exchanger to an internal space of the liquid hydrogen tank;

a pressure gauge configured to measure a pressure in the internal space of the liquid hydrogen tank;

a gas flowmeter configured to measure an amount of the gaseous hydrogen that has passed through the second adjustment valve and has been supplied to the downstream side; and a control unit, in which the control unit performs:

a volatilization amount calculation process of calculating an amount Y of the liquid hydrogen that has passed through the first adjustment valve and has been volatilized during a predetermined time after the first and second adjustment valves are opened by using a pressure P0 in the internal space of the liquid hydrogen tank that is measured before the first and second adjustment valves are opened, a pressure P1 in the internal space of the liquid hydrogen tank that is measured after the lapse of the predetermined time since the first and second adjustment valves are opened, and an amount X of the gaseous hydrogen that has passed through the second adjustment valve and has been supplied to the downstream side during the predetermined time; and a fluid level calculation process of calculating a fluid level H of the liquid hydrogen in the liquid hydrogen tank after the lapse of the predetermined time since the first and second adjustment valves are opened by using a relational expression showing a relationship between the fluid level H of the liquid hydrogen in the liquid hydrogen tank and an amount Y1 of the liquid hydrogen that passes through the first adjustment valve and drops therefrom, and the amount Y of the liquid hydrogen obtained in the volatilization amount calculation process.

According to the aforementioned exemplary aspects of the present disclosure, it is possible to provide a method for measuring a fluid level in a liquid hydrogen tank and a liquid hydrogen storage system by which a fluid level of liquid hydrogen in a liquid hydrogen tank can be measured by using an inexpensive configuration.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, embodiments according to the present disclosure are explained with reference to the figures. Note that in each of the figures mentioned below, the same reference symbols are assigned to the same or equivalent elements and duplicated explanations are omitted as appropriate.

Firstly, a structure of a liquid hydrogen storage system 10 according to this embodiment is explained with reference to FIG. 1. Note that hereinbelow, an explanation is given regarding an example, although this embodiment is not limited thereto, in which the liquid hydrogen storage system 10 and a method for measuring a fluid level according to this embodiment are applied to a system that is installed in a vehicle and supplies gaseous hydrogen obtained by volatilizing liquid hydrogen stored in a liquid hydrogen tank to fuel cells (hereinbelow, referred to as FCs) in the vehicle. The liquid hydrogen storage system 10 and the method for measuring a fluid level may be applied to, for example, a system that is installed in a plant and supplies gaseous hydrogen to equipment that uses the gaseous hydrogen within the plant.

Figure 1:
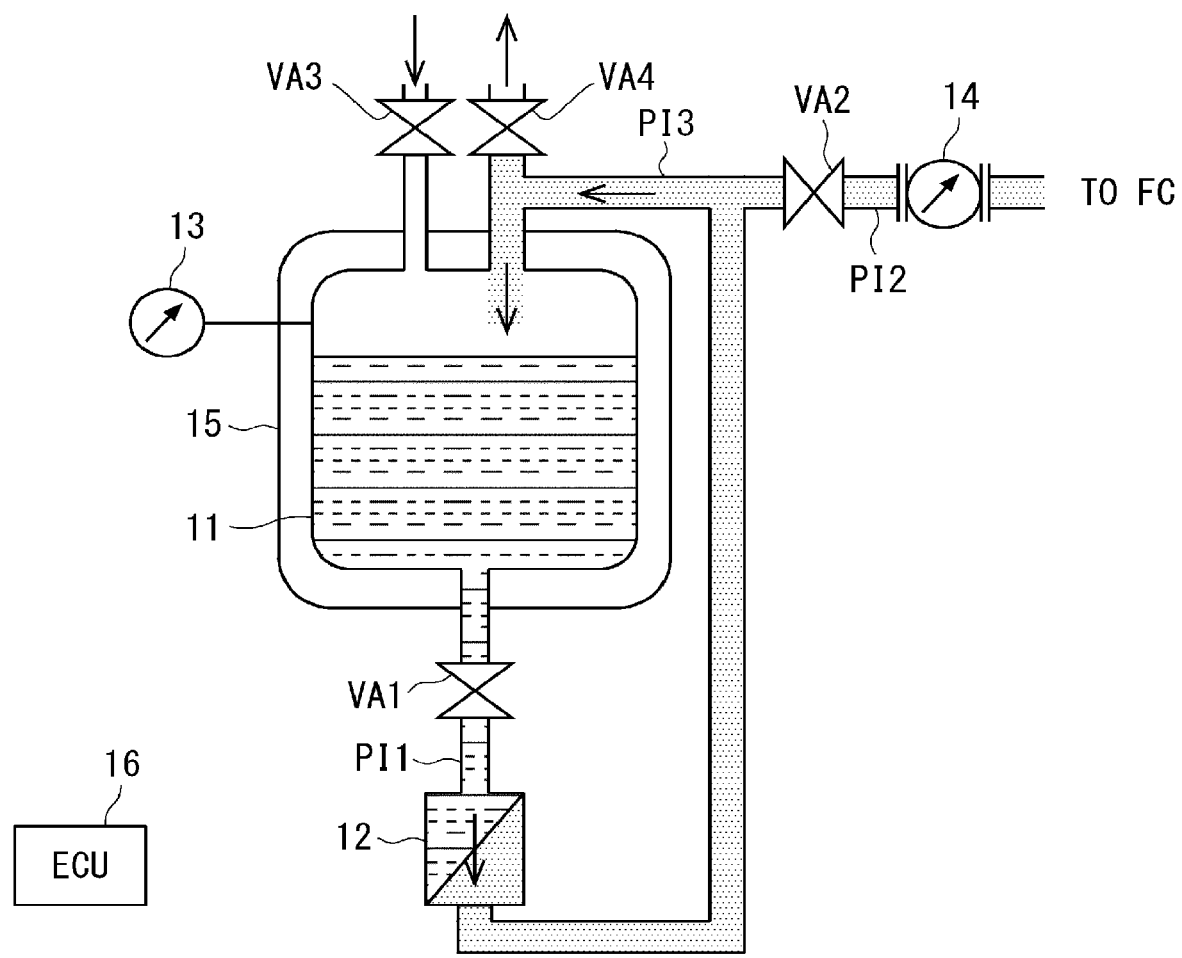
FIG. 1 is a diagram showing an example of a structure of a liquid hydrogen storage system according to an embodiment.

As shown in FIG. 1, the liquid hydrogen storage system 10 according to this embodiment includes a liquid hydrogen tank 11, a heat exchanger 12, a pressure gauge 13, a gas flowmeter 14, an outer shell member 15, an electronic control unit (hereinafter referred to as ECU) 16, a liquid hydrogen dispensing pipe PI1, a gaseous hydrogen supply pipe PI2, a gaseous hydrogen recirculation pipe PI3, a liquid hydrogen adjustment valve VA1, a gaseous hydrogen adjustment valve VA2, a liquid hydrogen injection valve VA3, and a gaseous hydrogen leak valve VA4. Note that the liquid hydrogen adjustment valve VA1 is an example of a first adjustment valve, and the gaseous hydrogen adjustment valve VA2 is an example of a second adjustment valve. Further, the ECU 16 is an example of a control unit.

The liquid hydrogen tank 11 is structured so that liquid hydrogen can be injected (i.e., supplied) and stored therein. The liquid hydrogen tank 11 is disposed in an internal space of the outer shell member 15, and the internal space of the outer shell member 15 is maintained in a vacuum state.

The pressure gauge 13 measures a pressure [MPa] in an internal space of the liquid hydrogen tank 11.

The liquid hydrogen dispensing pipe PI1 is disposed vertically below the liquid hydrogen tank 11 and is provided for dispensing liquid hydrogen from the liquid hydrogen tank 11 using gravity.

The liquid hydrogen adjustment valve VA1 is disposed at a midway point of the liquid hydrogen dispensing pipe PI1 and is capable of adjusting an amount [g] of the liquid hydrogen dispensed from the liquid hydrogen tank 11. In this embodiment, the amount [g] of the liquid hydrogen dispensed from the liquid hydrogen tank 11 is adjusted by adjusting the time [seconds] during which the liquid hydrogen adjustment valve VA1 is opened. Note that the liquid hydrogen adjustment valve VA1 is preferably covered with a heat insulating material or the like since it needs to be thermally-insulated from the heat exchanger 12 described later.

The heat exchanger 12 is connected to the liquid hydrogen dispensing pipe PI1 and is provided for obtaining gaseous hydrogen by exchanging heat with ambient air and thereby volatilizing the liquid hydrogen that has passed through the liquid hydrogen adjustment valve VA1. Note that the heat exchanger 12 it not limited to one that exchanges heat with the ambient air, and may be one that exchanges heat with liquid such as water circulating in the vehicle or may be one that exchanges heat with a heat source such as a heater. Further, the heat exchanger 12 may be one in which a plurality of heat exchangers are combined.

The gaseous hydrogen supply pipe PI2 supplies the gaseous hydrogen that has passed through the heat exchanger 12 to the FC disposed downstream.

The gaseous hydrogen adjustment valve VA2 is disposed at a midway point of the gaseous hydrogen supply pipe PI2 and is capable of adjusting an amount [g] of the gaseous hydrogen supplied to the FC disposed downstream. In this embodiment, the amount [g] of the gaseous hydrogen supplied to the FC disposed downstream is adjusted by adjusting the time [seconds] during which the gaseous hydrogen adjustment valve VA2 is opened.

The gas flowmeter 14 measures the amount [g] of the gaseous hydrogen that has passed through the gaseous hydrogen adjustment valve VA2 and has been supplied to the FC disposed downstream.

The gaseous hydrogen recirculation pipe PI3 recirculates the gaseous hydrogen that has passed through the heat exchanger 12 to the internal space of the liquid hydrogen tank 11.

The liquid hydrogen injection valve VA3 is capable of adjusting the amount [g] of the liquid hydrogen injected into the liquid hydrogen tank 11. In this embodiment, the amount [g] of the liquid hydrogen injected into the liquid hydrogen tank 11 is adjusted by adjusting the time [seconds] during which the liquid hydrogen injection valve VA3 is opened.

The gaseous hydrogen leak valve VA4 is capable of adjusting the amount [g] of the gaseous hydrogen discharged from the internal space of the liquid hydrogen tank 11 to the outside thereof. In this embodiment, the amount [g] of the gaseous hydrogen discharged from the internal space of the liquid hydrogen tank 11 to the outside is adjusted by adjusting the time [seconds] during which the gaseous hydrogen leak valve VA4 is opened. For example, when the internal space of the liquid hydrogen tank 11 becomes a high pressure state, there is a risk of the liquid hydrogen tank 11 being expanded. Therefore, the gaseous hydrogen leak valve VA4 is opened and the gaseous hydrogen in the internal space of the liquid hydrogen tank 11 is discharged to the outside.

The ECU 16 is connected to the liquid hydrogen adjustment valve VA1, the gaseous hydrogen adjustment valve VA2, the liquid hydrogen injection valve VA3, and the gaseous hydrogen leak valve VA4 via control lines (not shown), and controls open/close states of the liquid hydrogen adjustment valve VA1, the gaseous hydrogen adjustment valve VA2, the liquid hydrogen injection valve VA3, and the gaseous hydrogen leak valve VA4. Further, the ECU 16 is connected to the pressure gauge 13 and the gas flowmeter 14 via control lines (not shown), and obtains measurement results of the pressure gauge 13 and the gas flowmeter 14. Further, the ECU 16 calculates the fluid level of the liquid hydrogen in the liquid hydrogen tank 11 using the measurement results obtained from the pressure gauge 13 and the gas flowmeter 14. Note that the ECU 16 also performs operations other than those described above by controlling each of the structural components in the liquid hydrogen storage system 10. However, the operations other than those mentioned above are not essential to the present disclosure and thus, explanations thereof are omitted.

Hereinbelow, a method for measuring a fluid level in the liquid hydrogen tank 11, carried out in the liquid hydrogen storage system 10 according to this embodiment is explained with reference to FIG. 2. Note that the flow of processes shown in FIG. 2 is, for example, performed periodically.

Figure 2:
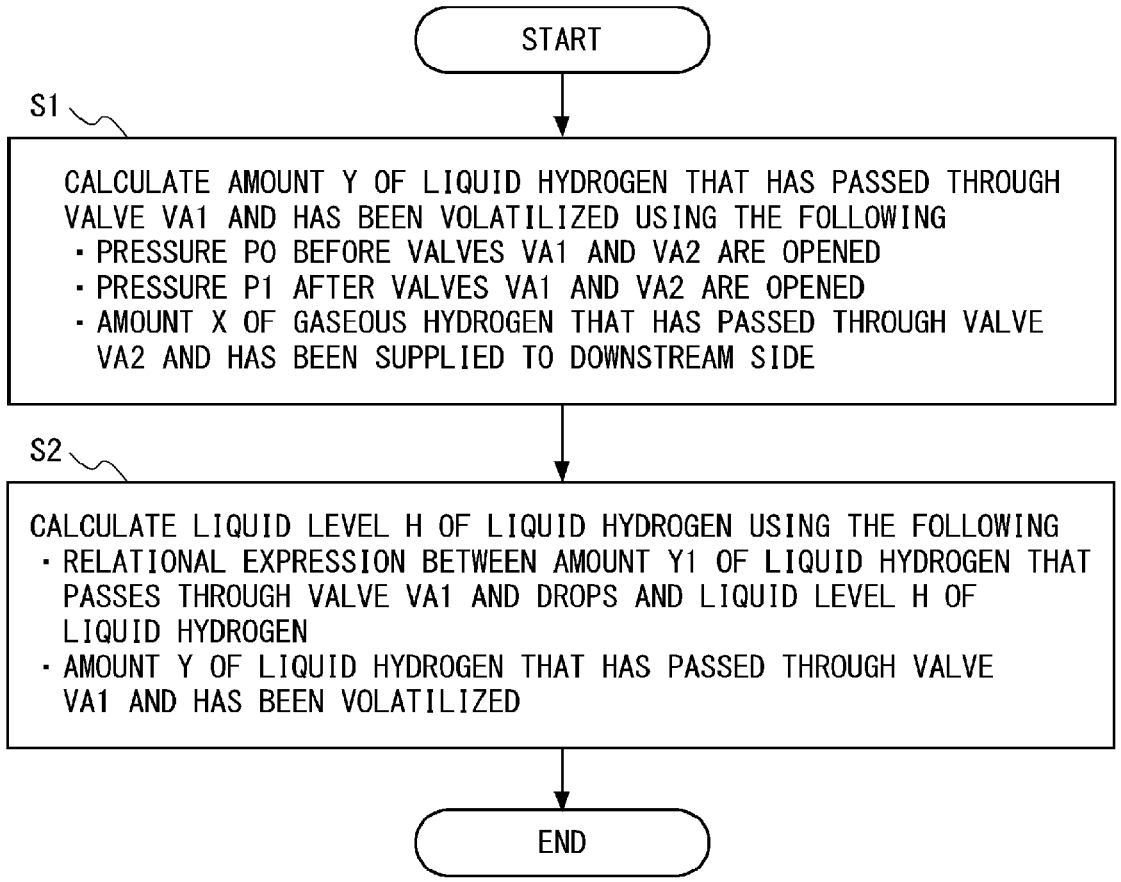
FIG. 2 is a flowchart for explaining an example of a method for measuring a fluid level in a liquid hydrogen tank according to an embodiment.

As shown in FIG. 2, firstly, the ECU 16 calculates, by using a pressure P0 in the internal space of the liquid hydrogen tank 11 that is measured before the liquid hydrogen adjustment valve VA1 and the gaseous hydrogen adjustment valve VA2 are opened, a pressure P1 in the internal space of the liquid hydrogen tank 11 that is measured when a predetermined time (hereinbelow, referred to as a time t) has elapsed since these adjustment valves VA1 and VA2 were opened, and an amount X of the gaseous hydrogen that has passed through the gaseous hydrogen adjustment valve VA2 and has been supplied to the FC disposed downstream during the time t, an amount Y of the liquid hydrogen that has passed through the liquid hydrogen adjustment valve VA1 and has been volatilized during the time t, during which these adjustment valves VA1 and VA2 are opened (Step S1).

Next, the ECU 16 calculates a fluid level H of the liquid hydrogen in the liquid hydrogen tank 11 after the lapse of the time t since the liquid hydrogen adjustment valve VA1 and the gaseous hydrogen adjustment valve VA2 were opened by using a relational expression showing a relationship between the fluid level H of the liquid hydrogen in the liquid hydrogen tank 11 and the amount Y1 of the liquid hydrogen that passes through the liquid hydrogen adjustment valve VA1 and drops therefrom, and the amount Y of the liquid hydrogen obtained in Step S1 (Step S2).

Next, the aforementioned Steps S1 and S2 are explained in detail.

(1) Regarding Step S1

First, Step S1 is explained in detail.

First, ECU 16 obtains, from the pressure gauge 13, the pressure P0 in the internal space of the liquid hydrogen tank 11 before the liquid hydrogen adjustment valve VA1 and the gaseous hydrogen adjustment valve VA2 are opened.

Next, the ECU 16 calculates an amount n0 of the gaseous hydrogen that is present in the internal space of the liquid hydrogen tank 11 before the liquid hydrogen adjustment valve VA1 and the gaseous hydrogen valve VA2 are opened by using the following equation of state of gas.

$$PV = nRT$$

Here, P represents a pressure; V represents a volume; n represents a mass; R represents a gas constant; and T represents a temperature.

Note that R is a fixed value. Further, the volume V can be calculated from the fluid level H of the liquid hydrogen in the liquid hydrogen tank 11 obtained in the previous measurement and the volume of the liquid hydrogen tank 11. Further, the temperature T can be calculated from the pressure P0 obtained from the pressure gauge 13 and the boiling point (known) of the liquid hydrogen.

Therefore, the only unknown parameters are P and n among the parameters of the aforementioned equation of state of gas. Accordingly, the ECU 16 obtains the mass n by substituting the pressure P0 obtained from the pressure gauge 13 for the parameter P in the equation of state of gas mentioned above. Further, the ECU 16 uses (i.e., regards) the obtained mass n as the amount n0 of the gaseous hydrogen that is present in the internal space of the liquid hydrogen tank 11 before the liquid hydrogen adjustment valve VA1 and the gaseous hydrogen adjustment valve VA2 are opened.

Next, the ECU 16 opens the liquid hydrogen adjustment valve VA1 and the gaseous hydrogen adjustment valve VA2 only for the time t and obtains, from the pressure gauge 13, the pressure P1 in the internal space of the liquid hydrogen tank 11 after the lapse of the time t since these adjustment valves VA1 and VA2 were opened.

Next, the ECU 16 calculates an amount n1 of the gaseous hydrogen that is present in the internal space of the liquid hydrogen tank 11 after the lapse of the time t since the liquid hydrogen adjustment valve VA1 and the gaseous hydrogen adjustment valve VA2 were opened by the same method as that employed when obtaining the amount n0.

Next, the ECU 16 calculates an amount Δn of an increase in the gaseous hydrogen in the internal space of the liquid hydrogen tank 11 during the time t during which the liquid hydrogen adjustment valve VA1 and the gaseous hydrogen adjustment valve VA2 were opened by subtracting n0 from n1 as shown below.

$$\Delta n = n1 - n0$$

ECU 16 also obtains, from the gas flowmeter 14, the amount X of the gaseous hydrogen that has passed through the gaseous hydrogen adjustment valve VA2 and has been supplied to the FC disposed downstream during the time t during which the liquid hydrogen adjustment valve VA1 and the gaseous hydrogen adjustment valve VA2 were opened.

Then, the ECU 16 calculates an amount Y of the liquid hydrogen that has passed through the liquid hydrogen adjustment valve VA1 and has been volatilized during the time t during which the liquid hydrogen adjustment valve VA1 and the gaseous hydrogen adjustment valve VA2 were opened by adding the amount X to the amount Δn as shown below.

$$Y = \Delta n + X$$

Note that in this embodiment, a temperature sensor for measuring the temperature of the internal space of the liquid hydrogen tank 11 is unnecessary since the ECU 16 calculates the temperature T of the gaseous hydrogen present in the internal space of the liquid hydrogen tank 11 by using the pressure P and the boiling point of the liquid hydrogen. When a temperature sensor is to be provided in the internal space of the liquid hydrogen tank 11, the temperature sensor needs to be resistive to low temperatures as well as explosion-proof, which is costly. Therefore, an inexpensive system configuration can be realized by the temperature sensor being unnecessary.

(2) Regarding Step S2

Next, Step S2 is explained in detail with reference to FIG. 3. Note that FIG. 3 is a schematic diagram schematically showing a structure of the liquid hydrogen tank 11 on the liquid hydrogen dispensing pipe PI1 side.

Figure 3:
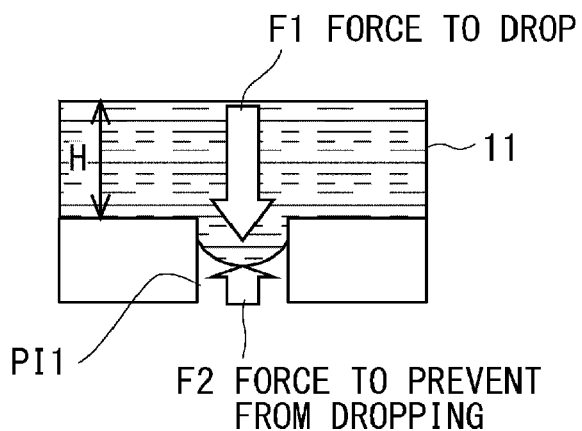
FIG. 3 is a diagram for explaining an example of processes performed in Step S2 shown in FIG. 2.

As shown in FIG. 3, when the liquid hydrogen adjustment valve VA1 (not shown in FIG. 3) is opened, a force F1 by which the liquid hydrogen passes through the liquid hydrogen valve VA1 and drops therefrom and a force F2 by which the liquid hydrogen is prevented from dropping are exerted on the liquid hydrogen stored in the liquid hydrogen tank 11. Accordingly, a force F3 by which the liquid hydrogen actually drops can be expressed by F1-F2.

Here, the force F1 by which the liquid hydrogen drops is expressed as shown below. Note that hereinbelow, it is assumed that a cross section of the liquid hydrogen dispensing pipe PI1 is a circle of a radius r.

$$F1 = \text{Circumference of liquid hydrogen dispensing pipe } PI1 \times \text{Fluid level of liquid hydrogen} \times \text{Gravity} \times \text{Density of liquid hydrogen} = 2\pi r \times H \times g \times \rho$$

Further, the force F2 by which the liquid hydrogen is prevented from dropping is expressed as shown below.

$$F2 = \text{Circumference of liquid hydrogen dispensing pipe } PI1 \times \text{Surface tension of liquid hydrogen} = 2\pi R \times \sigma$$

Therefore, the force F3 by which the liquid hydrogen actually drops is expressed as shown below.

$$F3 = 2\pi r \times H \times g \times \rho - 2\pi r \times \sigma$$

Here, the amount Y1 of the liquid hydrogen that passes through the liquid hydrogen adjustment valve VA1 and drops therefrom during the time t during which the liquid hydrogen adjustment valve VA1 (and the gaseous hydrogen adjustment valve VA2) is (are) opened becomes larger as the force F3 becomes larger.

Therefore, the amount Y1 of the liquid hydrogen that passes through the liquid hydrogen adjustment valve VA1 and drops therefrom during the time t can be expressed by the following relational expression.

$$Y1 = f(F3) = f(2\pi r \times H \times g \times \rho - 2\pi r \times \sigma)$$

Here, r, g, ρ, and σ are fixed values.

Therefore, the only unknown parameters are H and P among the parameters of the aforementioned relational expression. Therefore, the aforementioned relational expression shows a relationship between the fluid level H of the liquid hydrogen and the amount Y1 of the liquid hydrogen that passes the liquid hydrogen adjustment valve VA1 and drops therefrom.

Further, it can be deemed that the amount Y1 of the liquid hydrogen that passes through the liquid hydrogen adjustment valve VA1 and drops therefrom is equal to the amount Y of the liquid hydrogen that has passed through the liquid hydrogen adjustment valve VA1 and has been volatilized obtained in Step S1.

Then, the ECU 16 can calculate the fluid level H of the liquid hydrogen in the liquid hydrogen tank 11 after the lapse of the time t since the liquid hydrogen adjustment valve VA1 (and the gaseous hydrogen adjustment valve VA2) was (were) opened by substituting the amount Y obtained in Step S1 to the amount Y1 in the above-shown relational expression.

As described above, according to this embodiment, firstly, the ECU 16 calculates, by using a pressure P0 in the internal space of the liquid hydrogen tank 11 that is measured before the liquid hydrogen adjustment valve VA1 and the gaseous hydrogen adjustment valve VA2 are opened, a pressure P1 in the internal space of the liquid hydrogen tank 11 that is measured when the time t has elapsed since these adjustment valves VA1 and VA2 were opened, and an amount X of the gaseous hydrogen that has passed through the gaseous hydrogen adjustment valve VA2 and has been supplied to the FC disposed downstream during the time t, an amount Y of the liquid hydrogen that has passed through the liquid hydrogen adjustment valve VA1 and has been volatilized during the time t. Next, the ECU 16 calculates the fluid level H of the liquid hydrogen in the liquid hydrogen tank 11 after the lapse of the time t since the liquid hydrogen adjustment valve VA1 and the gaseous hydrogen adjustment valve VA2 were opened by using the relational expression showing the relationship between the fluid level H of the liquid hydrogen in the liquid hydrogen tank 11 and the amount Y1 of the liquid hydrogen that passes through the liquid hydrogen adjustment valve VA1 and drops therefrom, and the amount Y of the liquid hydrogen obtained as described above.

Therefore, only the pressure gauge 13 and the gas flowmeter 14 are required as the sensors that are necessary to measure the fluid level H of the liquid hydrogen in the liquid hydrogen tank 11. That is, the liquid hydrogen fluid-level sensing element that is made of a superconductive alloy or the like which is resistive to low temperatures as well as explosion-proof, and is immersed in the liquid hydrogen when being used, like the one disclosed in Japanese Patent No. 5440678, is no longer necessary. Accordingly, the fluid level H of the liquid hydrogen in the liquid hydrogen tank 11 can be measured by using an inexpensive configuration.

Note that application of the method for measuring the fluid level in the liquid hydrogen tank 11 according to this embodiment is not limited to the liquid hydrogen storage system 10 shown in FIG. 1. That is, the method can be applied to other liquid hydrogen storage systems.

Hereinbelow, other examples of liquid hydrogen storage systems to which the method for measuring the fluid level in the liquid hydrogen tank 11 according to this embodiment can be applied are explained with reference to FIGS. 4 and 5.

Figure 4:
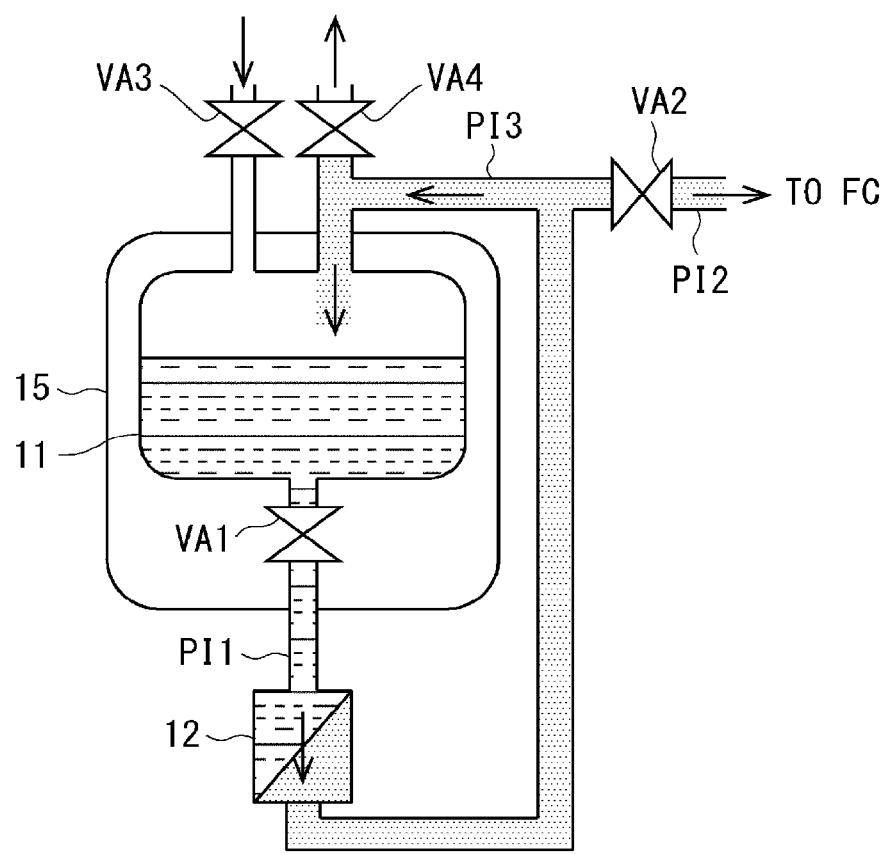
FIG. 4 is a diagram showing another structural example of a liquid hydrogen storage system according to an embodiment.

A liquid hydrogen storage system 10A shown in FIG. 4 differs from the liquid hydrogen storage system 10 shown in FIG. 1 in that the liquid hydrogen adjustment valve VA1 is disposed inside the outer shell member 15. In the structure shown in FIG. 4, since the liquid hydrogen adjustment valve VA1 is thermally-insulated from the heat exchanger 12, there is no need to cover the liquid hydrogen adjustment valve VA1 with a heat-insulating material or the like as in the structure of FIG. 1.

Figure 5:
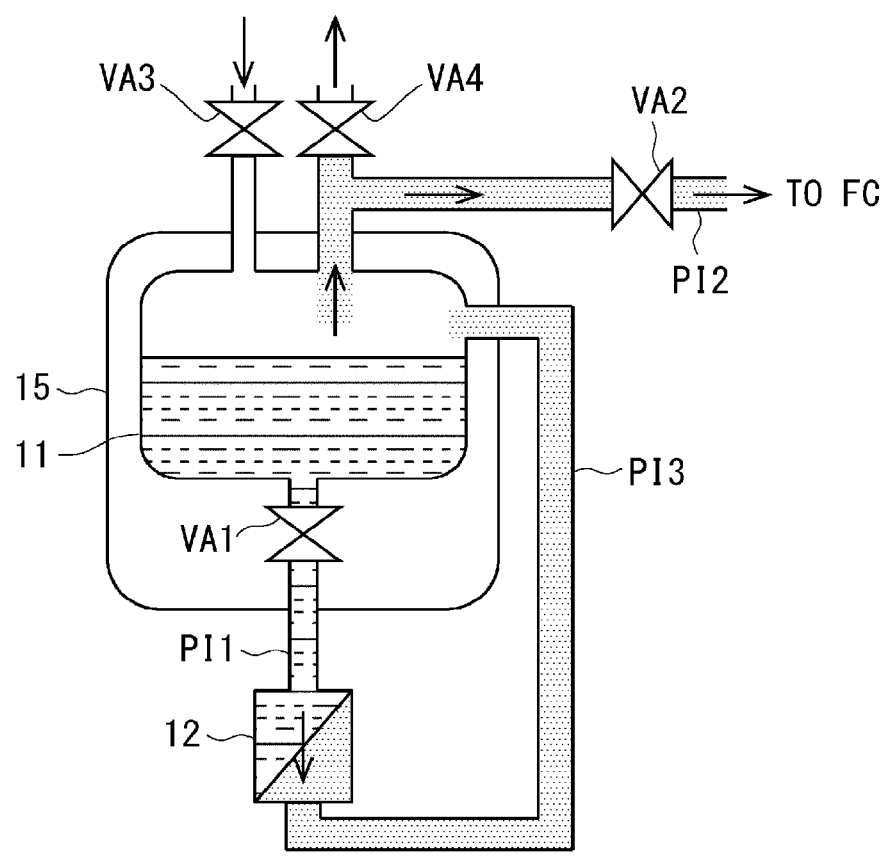
FIG. 5 is a diagram showing further another structural example of a liquid hydrogen storage system according to an embodiment.

Further, a liquid hydrogen storage system 10B shown in FIG. 5 differs from the liquid hydrogen storage system 10A shown in FIG. 4 in that the gaseous hydrogen that has passed through the heat-exchanger 12 is temporarily recirculated to the internal space of the liquid hydrogen tank 11 and then supplied to the FC disposed downstream.

Note that the present disclosure is not limited to the embodiments described above and the embodiments can be modified as appropriate without departing from the scope and spirit of the present disclosure.

For example, according to the present disclosure, the ECU may include a processor such as a CPU (Central Processing Unit) and a memory. Further, it is possible to implement an arbitrary process of the ECU by having the processor load a computer program stored in the memory and execute the loaded computer program.

In the aforementioned embodiments, the program can be stored and provided to a computer using any type of non-transitory computer readable media. Non-transitory computer readable media include any type of tangible storage medium. Examples of non-transitory computer readable media include magnetic storage media (e.g. a floppy disk, a magnetic tape, a hard disk drive, etc.), optical magnetic storage media (e.g. magneto-optical disk), CD-ROM (Compact Disc-Read Only Memory), CD-R (CD-Recordable), CD-R/W (CD-Rewritable), and semiconductor memories (e.g. mask ROM, PROM (Programmable ROM), EPROM (Erasable PROM), flash ROM, RAM (Random Access Memory)). The program may be provided to a computer using any type of transitory computer readable medium. Examples of transitory computer readable media include electric signals, optical signals, and electromagnetic waves. Transitory computer readable media can provide the program to a computer via a wired communication line such as an electric wire or optical fibers or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for measuring a fluid level in a liquid hydrogen tank performed in a liquid hydrogen storage system, the liquid hydrogen storage system comprising:

the liquid hydrogen tank configured so that liquid hydrogen can be injected and stored therein;

a liquid hydrogen dispensing pipe disposed vertically below the liquid hydrogen tank and configured to dispense the liquid hydrogen from the liquid hydrogen tank;

a first adjustment valve disposed at a midway point of the liquid hydrogen dispensing pipe and configured to adjust an amount of the liquid hydrogen dispensed from the liquid hydrogen tank;

a heat exchanger connected to the liquid hydrogen dispensing pipe;

a gaseous hydrogen supply pipe configured to supply gaseous hydrogen that has passed through the heat exchanger to a downstream side;

a second adjustment valve disposed at a midway point of the gaseous hydrogen supply pipe and configured to adjust an amount of the gaseous hydrogen supplied to the downstream side;

a gaseous hydrogen recirculation pipe configured to recirculate the gaseous hydrogen that has passed through the heat exchanger to an internal space of the liquid hydrogen tank;

a pressure gauge configured to measure a pressure in the internal space of the liquid hydrogen tank; and a gas flowmeter configured to measure an amount of the gaseous hydrogen that has passed through the second adjustment valve and has been supplied to the downstream side, the method comprising:

a volatilization amount calculation step of calculating an amount Y of the liquid hydrogen that has passed through the first adjustment valve and has been volatilized during a predetermined time after the first and second adjustment valves are opened by using a pressure P0 in the internal space of the liquid hydrogen tank that is measured before the first and second adjustment valves are opened, a pressure P1 in the internal space of the liquid hydrogen tank that is measured after the lapse of the predetermined time since the first and second adjustment valves are opened, and an amount X of the gaseous hydrogen that has passed through the second adjustment valve and has been supplied to the downstream side during the predetermined time; and a fluid level calculation step of calculating a fluid level H of the liquid hydrogen in the liquid hydrogen tank after the lapse of the predetermined time since the first and second adjustment valves are opened by using a relational expression showing a relationship between the fluid level H of the liquid hydrogen in the liquid hydrogen tank and an amount Y1 of the liquid hydrogen that passes through the first adjustment valve and drops therefrom, and the amount Y of the liquid hydrogen obtained in the volatilization amount calculation step.

2. The method for measuring the fluid level in the liquid hydrogen tank according to claim 1, wherein the volatilization amount calculation step comprises:

calculating an amount n0 of the gaseous hydrogen present in the internal space of the liquid hydrogen tank before the first and second adjustment valves are opened by using the pressure P0;

measuring an amount n1 of the gaseous hydrogen present in the internal space of the liquid hydrogen tank after the lapse of the predetermined time since the first and second adjustment valves are opened by using the amount P1;

calculating an amount Δn of an increase in the gaseous hydrogen in the internal space of the liquid hydrogen tank during the predetermined time by subtracting the amount n0 from the amount n1; and calculating the amount Y by adding the amount Δn to the amount X.

3. The method for measuring the fluid level in the liquid hydrogen tank according to claim 1, wherein in the fluid level calculation step, the fluid level H after the lapse of the predetermined time since the first and second adjustment valves are opened is calculated by substituting the amount Y obtained in the volatilization amount calculation step for the amount Y1 in the relational expression.

4. A liquid hydrogen storage system comprising:

a liquid hydrogen tank configured so that liquid hydrogen can be injected and stored therein;

a liquid hydrogen dispensing pipe disposed vertically below the liquid hydrogen tank and configured to dispense the liquid hydrogen from the liquid hydrogen tank;

a first adjustment valve disposed at a midway point of the liquid hydrogen dispensing pipe and configured to adjust an amount of the liquid hydrogen dispensed from the liquid hydrogen tank;

a heat exchanger connected to the liquid hydrogen dispensing pipe;

a gaseous hydrogen supply pipe configured to supply gaseous hydrogen that has passed through the heat exchanger to a downstream side;

a second adjustment valve disposed at a midway point of the gaseous hydrogen supply pipe and configured to adjust an amount of the gaseous hydrogen supplied to the downstream side;

a gaseous hydrogen recirculation pipe configured to recirculate the gaseous hydrogen that has passed through the heat-exchanger to an internal space of the liquid hydrogen tank;

a pressure gauge configured to measure a pressure in the internal space of the liquid hydrogen tank;

a gas flowmeter configured to measure an amount of the gaseous hydrogen that has passed through the second adjustment valve and has been supplied to the downstream side; and a control unit, wherein the control unit performs:

a volatilization amount calculation process of calculating an amount Y of the liquid hydrogen that has passed through the first adjustment valve and has been volatilized during a predetermined time after the first and second adjustment valves are opened by using a pressure P0 in the internal space of the liquid hydrogen tank that is measured before the first and second adjustment valves are opened, a pressure P1 in the internal space of the liquid hydrogen tank that is measured after the lapse of the predetermined time since the first and second adjustment valves are opened, and an amount X of the gaseous hydrogen that has passed through the second adjustment valve and has been supplied to the downstream side during the predetermined time; and a fluid level calculation process of calculating a fluid level H of the liquid hydrogen in the liquid hydrogen tank after the lapse of the predetermined time since the first and second adjustment valves are opened by using a relational expression showing a relationship between the fluid level H of the liquid hydrogen in the liquid hydrogen tank and an amount Y1 of the liquid hydrogen that passes through the first adjustment valve and drops therefrom, and the amount Y of the liquid hydrogen obtained in the volatilization amount calculation process.

* * * * *